Figure 5:
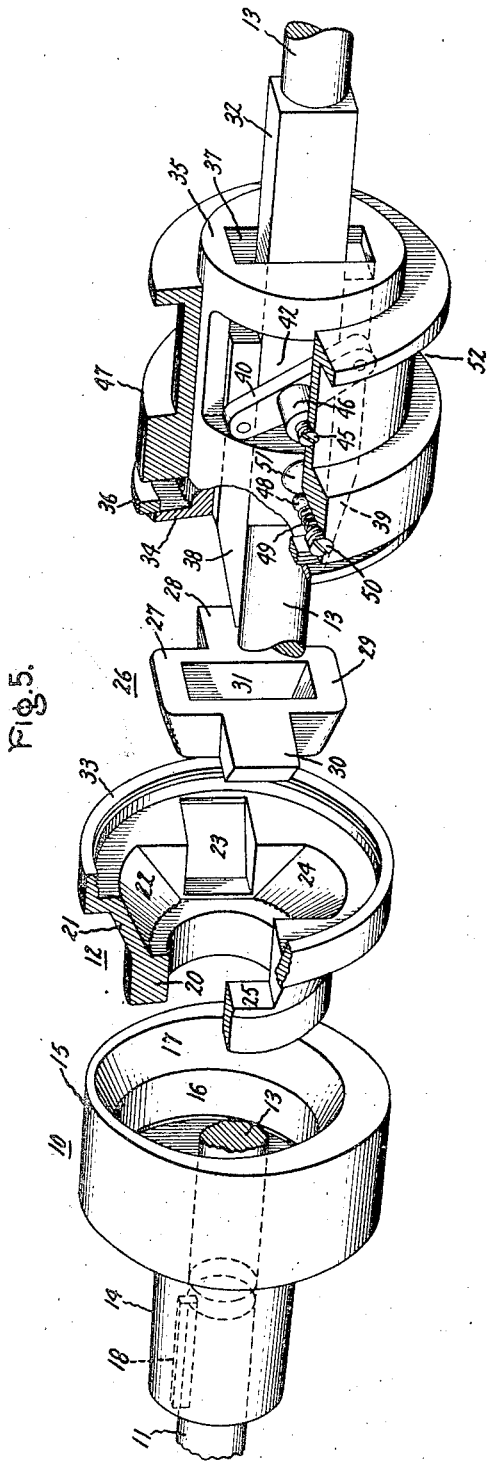

Aug. 14, 1945.　　　F. E. FISHER　　　2,382,869
CLUTCH
Filed March 14, 1944　　　2 Sheets-Sheet 1
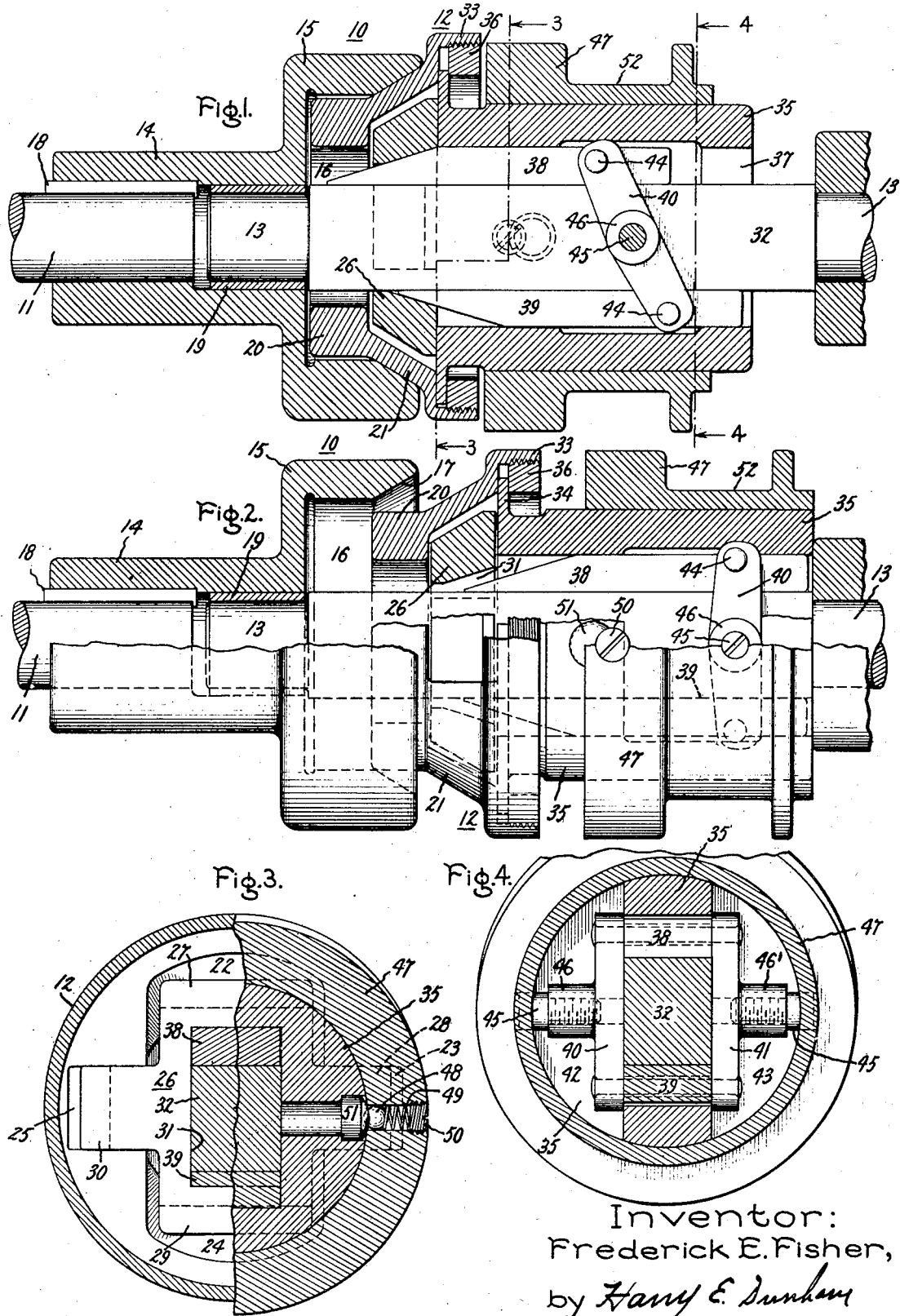
Inventor:
Frederick E. Fisher,
by Harry E. Dunham
His Attorney.

Aug. 14, 1945.  F. E. FISHER  2,382,869
CLUTCH
Filed March 14, 1944   2 Sheets-Sheet 2

Inventor:
Frederick E. Fisher,
by Harry E. Dunham
His Attorney.

Patented Aug. 14, 1945

2,382,869

UNITED STATES PATENT OFFICE 2,382,869

CLUTCH

Frederick E. Fisher, Scotia, N. Y., assignor to General Electric Company, a corporation of New York Application March 14, 1944, Serial No. 526,366

6 Claims. (Cl. 192—67)

My invention relates to clutches and has for one of its objects the provision of an improved clutch which may be closed in any possible angular relationship of its cooperating members.

Another object of my invention is the provision of a clutch in which no slippage takes place between the clutching surfaces.

Other objects and advantages of my invention will be apparent from a consideration of the following specification taken in connection with the accompanying drawings, and its scope will be pointed out with particularity in the appended claims.

In the accompanying drawings, Figs. 1 and 2 are sectional elevations, of a clutch embodying my invention, taken along the axis of rotation. Figs. 3 and 4 are sectional views respectively, along lines 3—3 and 4—4 of Fig. 1 looking in the direction of the arrows, and Fig. 5 is an exploded view illustrating the respective elements of the clutch in perspective, and arranged on the common axis.

Referring to the drawings in detail and using the same numeral to designate each corresponding element in the several figures, my clutch comprises a clutch member 10 rigidly mounted on a shaft 11 and a cooperating clutch member 12 suitably supported and connected to drive a shaft 13 and movable into, and out of, engagement with the member 10. The member 10 comprises a sleeve 14 which is enlarged at its front end 15, having in this large end a preferably circular aperture 16 of suitable depth, which is displaced from or is eccentric with respect to, the axis of the sleeve. The mouth of the aperture 16 is flared as shown at 17 for the purpose of guiding the forward end of the member 12 into the aperture.

The sleeve 14 is rigidly mounted on the shaft 11, being keyed thereto by a key 18. The shaft 11 projects into the sleeve 14 only for a portion of the sleeve length. The remaining portion of the sleeve 14 is provided with a bearing sleeve 19, into which the end of the shaft 13 is projected for support.

The clutch member 12 comprises a ring 20 having a slightly smaller outside diameter than the diameter of the aperture 16 and an inside diameter large enough to enable the ring to move radially of the shaft to register with the aperture 16. This ring is integral with a cone section 21 which is provided with recesses 22, 23, 24 and 25 in its inner surface, as shown in Fig. 3 and Fig. 5, to receive respectively the arms 27, 28, 29 and 30 of a cross-shaped intermediate member 26. The intermediate member 26 is provided with a rectangular and closed slot 31 which extends partially into the arms 27, and 29. This intermediate member 26 is mounted on a rectangular section 32 of the shaft 13; the slot 31 being so dimensioned that the intermediate member may move transversely on the shaft section to a limited extent, in either direction, in a path parallel to the arms 27 and 29 (in a vertical direction, as shown in the drawing). The arms 30 and 28 of the intermediate member 26 extend into the recesses 25 and 23 in the clutch member 12 and thereby carry the member 12 during such motion.

The arms 30 and 28 are in sliding engagement with the recesses 25 and 23 while the recesses 22 and 24 are wider than the arms 27 and 29 so as to enable the arms to move laterally in the slots. The clutch member 12 is thereby enabled to move relatively to the member 26 in either direction along a path which is parallel to the arms 30 and 28 and at right angles to the first-mentioned path of movement. When the intermediate member 26 is positioned within the clutch member 12 with its arms in the respective slots or apertures as shown in Fig. 3, the possible movement of the member 26 on the shaft section 32 and the possible movement of the clutch member 12 on the intermediate member 26, which two movements are perpendicular to each other, make possible a coordination of these two movements in any necessary proportion to produce a limited movement of the clutch member 12 in any radial direction from the axis of rotation. The extent of this radial movement is made substantially equal to the displacement, from the axis of rotation, of the aperture 16, in clutch member 10.

A collar 33 is provided on the edge of the conical section 21 which collar is projected over the edge of a flange 34 on the end of a hub member 35. The flange 34 is smaller than the collar 33 and a ring 36 having a width sufficient to project over the flange 34 is threaded into this collar until it provides for only a sliding movement of the flange between itself and the end of the conical section 21 thereby connecting the hub 35 to clutch member 12. The clearance provided between the collar 33 and the edge of the flange 34 makes possible a radial movement of the clutch member 12 relatively to the hub member 35.

The hub member 35 is provided with a rectangular closed slot 37 extending axially through it. It is mounted for longitudinal movement upon the rectangular portion 32 of the shaft 13. This closed slot 37 is wide enough to permit sliding movement of the hub on the shaft section 32 and it is longer, in cross section, than the shaft section 32 to accommodate wedges 38 and 39 between its ends and the shaft. The wedges are mounted for sliding movement relatively to the shaft, as well as relatively to the hub, in the slot 37.

The wedges 38 and 39 are connected to each other by links 40 and 41, mounted adjacent to the two opposite sides of the shaft section 32 (see Fig. 4) within recesses 42 and 43 in the hub 35. The recesses are of sufficient length to permit a limited axial movement of the links within the recesses. The links are loosely pinned to the wedges by pins 44 attached at the respective ends of the links and projecting through clearance holes in the wedges to provide a mechanical connection between the two wedges. The links are pivoted at their centers by screws 45 projecting into bosses 46 and 46′, on the links, through the wall of a sleeve 47 surrounding the hub 35.

The sleeve 47 is slidable on the hub and, being connected to the links, may move relatively to the hub 35 within the limits of the movement of the links 40 and 41 within their respective recesses 42 and 43 in the hub. A resistance to the movement of the sleeve 47 on the hub 35 in either direction is effected by a ball 48 pressed into suitable depressions on the hub surface. The pressure on the ball 48 is exerted by a helical spring 49 projecting against the ball in a hole extending through the wall of the sleeve 47 and adjustably compressed by a screw 58 (see Fig. 3). A rounded plug 51 is sunk into the surface of the hub so that its edge is slightly below the surface of the hub and its center is level with the hub surface, thereby providing a depression on each side of its center. The ball 48 is normally pressed into the depression on one side of the plug center by the spring 49, and provides a resistance to a movement of the sleeve 12 on the hub the magnitude of which is determined by the amount of compression on the spring 49. When this resistance is overcome the ball 48 is moved into the sleeve 47 while the sleeve is moved relatively to the hub. The ball is immediately pressed into the depression on the other side of the plug center when the sleeve has moved the necessary distance and is then in position to resist a return movement thereof. (See Figs. 1 and 5.) The sleeve 47 is provided with a wide groove 52 on its outer surface into which the prongs of a conventional forked actuating member, not shown, may project to move the sleeve.

In operation the clutch member 10 is preferably mounted on the drive shaft, such as shaft 11, with clutch member 12 supported on the driven shaft 13. When the clutch is open the members are in the axial relationship shown in Fig. 2. When it is desired to close the clutch to drive shaft 13 the sleeve 47 is moved axially toward the clutch member 10. Due to the resistance to relative movement between the sleeve 47 and the hub member 35, effected by the ball 48 and spring 49, the complete assembly including the hub 35, the member 26 and clutch member 12 are moved toward the clutch member 10. When the clutch member 12 enters the flared portion 17 of the aperture 16, it is engaged by the surface of the flared portion 17; this engagement being at a point which continually moves so that this surface in effect rolls over the surface of the clutch member 12. The clutch member 12 being free to move in any radial direction from the axis, merely moves relatively to the axis of rotation in accordance with the continually shifting radial pressure exerted by the surface 17. Therefore a sliding action takes place between the clutch member 12, the intermediate member 26 and shaft section 32 but no tangential sliding action takes place between the two engaging surfaces of the clutch members 10 and 12. The same relative motion of the two surfaces continues as the member 12 proceeds from the flared portion 17 into the aperture 16.

The clutch member 12 is moved axially until it reaches its ultimate position within the aperture 16 as shown in Fig. 1. The resistance to further axial movement of the member 12 then overcomes the resistance to movement between the sleeve 47 and the hub 35 whereby the sleeve 47 moves over the hub surface and carries with it the links 40, 41 and the wedges 38 and 39. At the same time, the forward ends of the wedges move into the slot 31 of the intermediate member as shown in Fig. 1. The radial movement of the intermediate member with respect to the shaft portion 32 is thereby stopped and the radial movement of the clutch member 12 relative to the shaft 13, which movement results from the coordinated movement of the intermediate member and the clutch member relatively to each other and relatively to the shaft, is no longer possible and a driving connection is effected between the clutch member 12 and its shaft 13.

The wedges 38 and 39 are free to move relatively to each other so that when one wedge is driven into its ultimate position to fill the space between one end of the slot 31 and the shaft section 32, the second wedge is driven home to fill the space at the other end of the slot, whereby the member 26 is completely locked against motion with respect to the shaft section 32. It is not necessary to lock the clutch member 12 to the intermediate member 26 because the elimination of one of the coordinates which makes possible the continuously shifting radial movement eliminates all possible movement between the clutch member 12 and its shaft and it thereby becomes a crank member, the length of the effective crank arm being the distance between the axis of rotation and the center of the aperture 16.

When it is desired to open the clutch, the sleeve 47 is moved back to draw the wedges 38 and 39 out of the slot 31 thereby enabling clutch member 12 to move relatively to the shaft. The driving connection is thereby broken but the movement of the sleeve is preferably continued until the clutch member 12 is clear of the aperture 16 and its flared portion 17 as shown in Fig. 2.

What I claim as new and desire to secure by Letters Patent of the United States, is:

1. In a clutch mechanism the combination of one clutch member provided with a substantially circular aperture eccentrically arranged with respect to the axis of rotation of said member, a second clutch member axially movable into engagement with said first clutch member and mounted upon a shaft, means permitting a continuously shifting radial movement of said second clutch member with respect to its shaft and means for locking said second clutch member against movement relatively to its shaft operable when said second clutch member is in engagement with said first clutch member.

2. In a clutch the combination of a clutch member provided with an aperture eccentrically arranged with respect to the axis of rotation, a second clutch member mounted upon a shaft arranged on the same axis of rotation, means for connecting said second clutch member to its shaft including an intermediate member permitting a motion of said second clutch member with respect to its shaft in two defined paths substantially perpendicular to each other, whereby a limited radial movement in any direction relatively to said shaft may be had, and means operable to prevent movement in one of said two defined paths.

3. In a clutch the combination of a clutch member provided with an aperture eccentrically arranged with respect to the axis of rotation of said member, a second clutch member, an intermediate member supporting said second clutch member, said second clutch member being movable relatively to said intermediate member in either direction along a substantially straight path, a shaft member supporting said intermediate member, said intermediate member being movable relatively to said shaft member in either direction along a substantially straight path, said last mentioned path being substantially at right angles to said first mentioned path, a hub member mounted on said shaft member and connected to move said second clutch member and said intermediate member axially along said shaft member, a wedge member mounted in said hub member and movable to lock said intermediate member against movement on said shaft member, and means for moving said wedge member.

4. In a clutch mechanism the combination of a clutch member provided with an aperture eccentrically arranged with respect to the axis of rotation of said clutch member, a second clutch member, an intermediate member for supporting said second clutch member and comprising four arms arranged at right angles to each other, said clutch member being movable with respect to said intermediate member guided by two of said arms, a shaft for supporting said intermediate member, said intermediate member with the clutch member supported thereon being movable upon said shaft in a path at right angles to said first path of movement as defined by a slot in said second pair of arms, a hub member mounted on said shaft and connected to move said second clutch member and said intermediate member axially along said shaft, and means mounted in said hub member operable to lock said intermediate member against movement relatively to said shaft.

5. In a clutch the combination of a clutch member provided with a substantially circular aperture eccentrically arranged with respect to the axis of rotation of said member, a second clutch member, an intermediate member supporting said second clutch member, said second clutch member being relatively movable with respect to this intermediate member in either direction along a defined path, a shaft member supporting this intermediate member said intermediate member being movable relatively to said shaft member in either direction along a defined path, this second path being at a substantial angle to said first mentioned path, a hub member mounted on said shaft and connected to said second clutch member and said intermediate member, a wedge member mounted in said hub member, a collar movable axially on said hub member and connected to said wedge, and means for temporarily locking said collar against movement upon said hub member until the second clutch member is in engagement with the first clutch member, said locking means being thereafter released so that upon movement of said collar upon said hub, the wedge is moved into position to lock said intermediate member against movement relatively to said shaft member.

6. In a clutch the combination of a clutch member provided with an aperture eccentrically arranged with respect to the axis of rotation of said member, a second clutch member, an intermediate member supporting said clutch member said clutch member being relatively movable with respect to said intermediate member in either direction along a defined path, a shaft member supporting this intermediate member, said intermediate member being movable relatively to said shaft member in either direction along a second path this second path being at a substantial angle to said first mentioned path, a hub member mounted on said shaft and connected to said second clutch member, a pair of wedges mounted in said hub on opposite sides of said shaft member, a link member loosely connecting said wedges to each other, a collar movable axially on said hub member and connected to said link and means for temporarily locking said collar against movement upon said hub until the second clutch member is in engagement with the first clutch member, said temporary locking means being thereafter released whereby upon movement of said collar upon said hub the wedges are moved into position to lock said intermediate member against movement relatively to said shaft member.

FREDERICK E. FISHER.